Dec. 30, 1969   E. G. RIGNEY   3,486,404
LIVE-CENTERED CHUCK ASSEMBLY FOR LATHE TAILSTOCK
Filed March 14, 1968
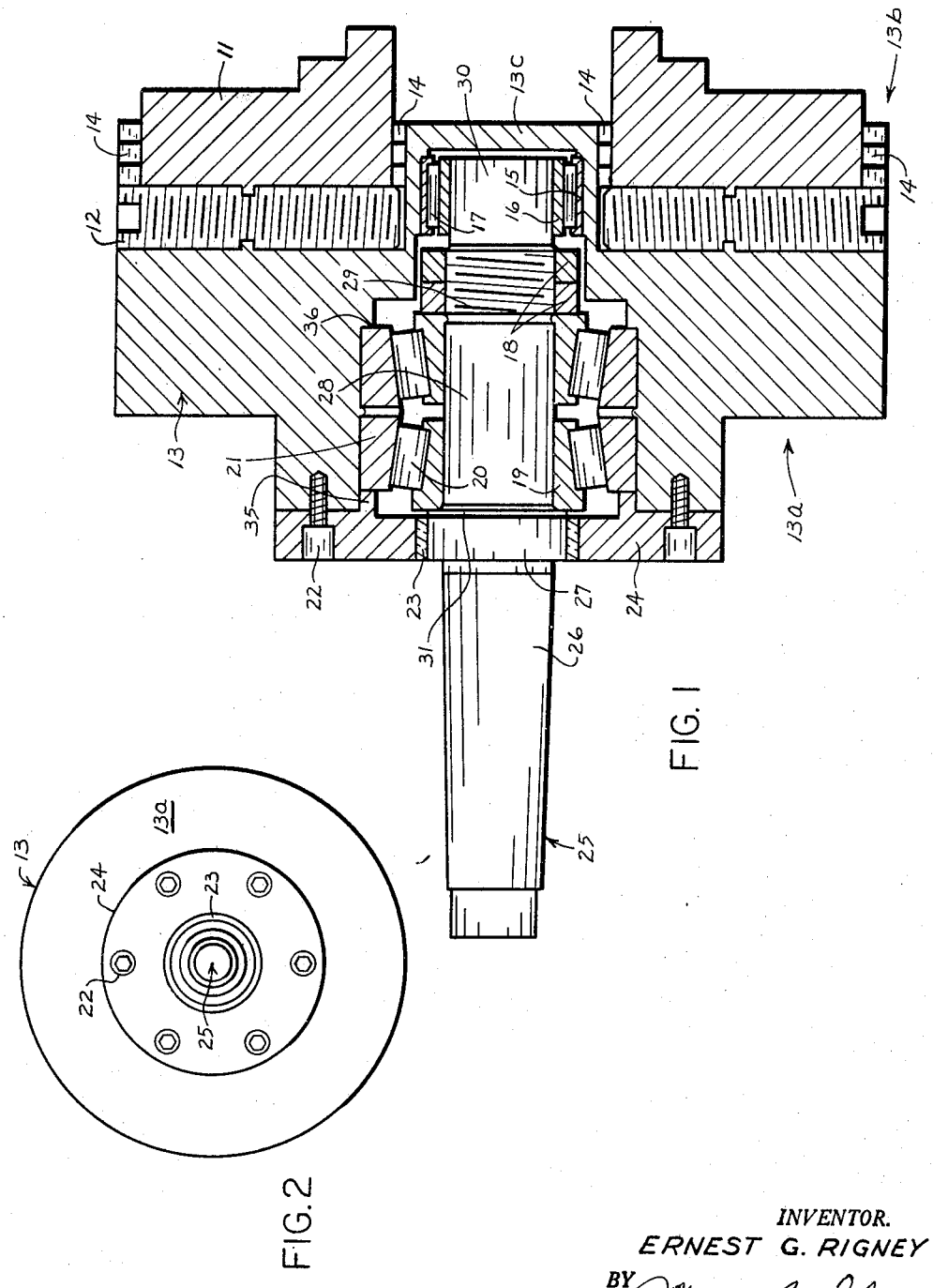
INVENTOR.
ERNEST G. RIGNEY
BY
AGENT

United States Patent Office 3,486,404
Patented Dec. 30, 1969

3,486,404
LIVE-CENTERED CHUCK ASSEMBLY FOR LATHE TAILSTOCK
Ernest G. Rigney, North Charleston, S.C., assignor to Westvaco Corporation, New York, N.Y., a corporation of Delaware
Filed Mar. 14, 1968, Ser. No. 712,987
Int. Cl. B23b 25/00, 5/22, 5/34
U.S. Cl. 82—38        4 Claims

ABSTRACT OF THE DISCLOSURE

A live-centered chuck assembly mounted as a cantilever in a lathe tailstock, whereby heavy, out-of-round work can be centered at both ends without removal from the lathe, comprising a chuck housing to which chuck jaws are adjustably attached and a free-spinning spindle which is rotatably attached to the chuck housing by special locking means and multiple bearing means capable of resisting deadweight stresses and moments of inertia created by the rotating work.

---

This invention relates to machine tools and particularly relates to a live-centered chuck assembly for a lathe tailstock.

Lathes are commonly driven at the headstock where the work is centered by a conventional chuck. At the tailstock, a steady rest may be used for holding the work if the exterior of the work is round. If the work is not round and if centering requirements are not severe, a central hole, for insertion of a stationary center or live center, may be made in the work with a hand drill or drill press. Alternatively, if sufficient stock is available, a ring equipped with jackscrews may be welded to the tail end of the work and a tail plate, equipped with a central hole, may be operated upon by these jackscrews. A trued-surface ring can then be turned in the surface of the work for use with a steady rest. If the work cannot be welded and if the surface of the work will not permit a trued-surface ring to be turned therein, a band with set screws may be placed around the work, and the set screws may be adjusted so that the surface of the band can be lightly turned to provide a true surface for a steady rest.

All of these procedures, and others which are available to the skilled machinist, provide versatile but relatively laborious techniques for overcoming problems which are presented by heavy, out-of-round work. If the screw-adjustable jaws of a conventional chuck could be spinnably mounted in the tailstock of a lathe, it would be possible to chuck and center both ends of heavy, out-of-round work so that machining operations could be readily performed on work of all shapes with much less time and labor needed for centering thereof.

Analyzed structurally, however, a live-centered chuck assembly mounted in this manner is clearly a cantilever and consequently is subject to unusual deadweight stresses in addition to considerable moments of inertia because the centroid of the work is likely to be outside of its axis of revolution. Special locking and bearing means are consequently necessary for withstanding these forces.

The object of this invention is to provide a live-centered chuck having a spindle and special locking and multiple bearing means whereby the shank end of the spindle can be inserted into a lathe tailstock and the chuck supported as a cantilever.

It is another object to provide a simple means for adjustment of the special locking and multiple bearing means and for easy access thereto.

The invention may be more readily understood by referring to the drawings.

FIG. 1 is a longitudinal cross section of the live-centered chuck of this invention.

FIG. 2 is a view of the live-centered chuck from the shank end thereof.

The live-centered chuck of this invention comprises a chuck housing 13 having a jaw face 13b and a shank face 13a at opposite ends thereof. In jaw face 13b are the parts of a conventional chuck, such as a plurality of threaded wells which are in radially diverging relationship, each well being contiguous with a slot having jaw tracks 14 in the sides thereof. At the center is a hub 13c which protrudes beyond the threaded wells. A centering screw 12, within each threaded well, is in threaded contact with jaw housing 13 and with a jaw 11 which slides radially upon jaw tracks 14, usually numbering four, whereby the jaws may be selectively adjusted to grip the work and move the work in relation to the axis of revolution of chuck housing 13. Chuck housing 13 contains a massive amount of metal in the circumferential space between jaw tracks 14 along jaw face 13b and is consequently rigid and strong.

A central cavity substantially occupies the interior of hub 13c and thus extends through chuck housing 13, in transverse relationship to the faces, from shank face 13a almost to, but slightly short of, jaw face 13b. This central cavity has a stepped surface of successively greater cross section as it nears shank face 13a.

A spindle 25 is centrally aligned within the cavity and has a shank 26 at one end which protrudes beyond shank face 13a for insertion into a lathe tailstock. A fulcrum shoulder 27, having an inner-race stop 31 on the side opposite to shank 26, is adjacent to the shank, and is succeeded successively by pressure section 28, threaded locking section 29, and a cantilever bearing section 30 which fits into the cavity within hub 13c.

An end cap 24, having a central opening with an annular bearing surface which is radially spaced apart from the periphery of bearing shoulder 27, is attached to chuck housing 13 with screws 22 so that the opening of the cavity in shank face 13a is covered. An outer-race stop 35 projects from the side of end cap 24 toward jaw face 13b.

The locking means, which transversely fixes spindle 25 in position, comprises outer-race stop 35, thrust shoulder 36 which projects transversely from the surface of the cavity inside chuck housing 13 toward shank face 13a at the same radial distance from the rotational axis of spindle 25 as outer-race stop 35, inner-race stop 31, and locking nuts 18 which are tightly threaded together upon threaded locking section 29 so that they fix the transverse position of spindle 25.

The bearing means comprises fulcrum bearing means which is adjacent to fulcrum shoulder 27, a thrust bearing means which is adjacent to pressure section 28, and a cantilever bearing means which is interjacent to cantilever bearing section 30 and the surface of the cavity inside hub 13c. The fulcrum bearing means is preferably a circular bronze bushing 23 between the annular bearing surface of end cap 24 and the outside surface of fulcrum shoulder 27. The thrust bearing means is a plurality of conventional thrust roller bearings 20 which operate between tapered inner races 19 and tapered outer races 21. The cantilever bearing means is preferably a plurality of needle bearings 17 which operate between inner race 16 and outer race 15.

Tapered outer races 21 are integrally formed and are locked in place between outer-race stop 35 and thrust shoulder 36. Tapered inner races 19 abut against inner-race stop 31 and locking nuts 18 and are held therebetween. Thrust forces upon spindle 25 are effectively resisted by this locking means for a conventional tapered thrust bearing assembly.

This chuck assembly is subjected to deadweight loads and to centrifugal forces which stress spindle 25 as a cantilevered beam. The three bearing means are designed to allow bending forces to be transmitted at the ends of the assembly through bronze bushing 23 and needle bearings 17 while transverse loads and thrust loads are withstood by thrust bearings 20.

This live-centered chuck is rigid but free-spinning, resists substantial thrust forces, and is capable of handling heavy and awkward loads which are capable of generating substantial moments of inertia when rotated in a lathe. For example, the live-centered chuck of this invention was used to repair a heavy cast-iron blower, having dimensions of 28 inches in diameter and 32 inches in length, and mounted upon a 7-inch diameter shaft which was 80 inches long. The manufacturer was unable to replace the shaft so that the shaft could be turned true with the outside diameter of the rotor. Even through the bore of the rotor was not bored true with the outside diameter of the rotor, the blower was successfully equipped with a new shaft by means of this chuck. The shaft was machined to fit the bore of the rotor, but other parts of the shaft were left oversize. After pressing the shaft in the rotor, the rotor was centered in the lathe tailstock by using the live-centered chuck of this invention. Then the shaft journals were machined true with the rotor. Without this live-centered chuck, the operations of centering the rotor and machining the shaft would have required experimenting with various time-consuming and laborious devices.

Tapped holes, which are closed with screws to retain lubricating fluid and exclude trash, can be placed in the face of hub 13c. Through these holes, the cantilever bearing means can be lubricated. When dismantling the live-centered chuck of this invention, steel rods can be pushed through these holes to remove spindle 25 and the cantilever bearing means from the cavity in housing 13.

The stepped surface of the cavity and the complete clearance of its opening in shank face 13a, by removal of end cap 24, makes replacement of parts an exceptionally easy task. The cantilever bearing means is slipped into place around cantilever bearing section 30, spindle 25 is inserted in the cavity inside housing 13, locking nuts 18 are threaded into tight position, and the thrust bearing means is slipped against the outward locking nut 18 and thrust shoulder 36. When end cap 24 is properly tightened against shank face 13a, the assembly is free spinning but closely positioned.

My invention is a new combination of basic components which is highly versatile in solving many machining problems for awkwardly shaped, heavy objects and is defined in the following claims.

I claim:
1. A live-centered chuck assembly which comprises:
   (A) a chuck housing having:
      (1) a jaw face and a shank face at opposed ends thereof, said jaw face having adjustably attached jaws which grip the work and selectively move the work in relation to the axis of revolution of said chuck housing, and
      (2) a central cavity which opens upon said shank face,
   (B) a spindle, which is aligned within said central cavity, having:
      (1) a shank near one end thereof,
      (2) a fulcrum shoulder which is adjacent to the shank,
      (3) a pressure section which is adjacent to the fulcrum shoulder,
      (4) a locking section which is adjacent to the pressure section, and
      (5) a cantilever bearing section which is adjacent to the locking section,
   (C) an end cap which is attached to the shank face of said chuck housing and covers said central cavity, said end cap having a central opening with an annular bearing surface which is radially spaced apart from said fulcrum shoulder,
   (D) locking means which transversely fix said spindle in position, and
   (E) multple bearing means, comprising:
      (1) a fulcrum bearing means which is interjacent to said fulcrum shoulder and said annular bearing surface of the end cap,
      (2) a thrust bearing means which is interjacent to said pressure section and the surface of said central cavity, and
      (3) a cantilever bearing means which is interjacent to said cantilever bearing section and the inner surface of said cavity near said jaw face.

2. The live-centered chuck of claim 1 wherein said locking means comprises:
   (1) an outer-race stop which is attached to said end cap and projects toward said jaw face,
   (2) a thrust shoulder, on the surface of said cavity, which projects toward said shank face at the same radial distance from the rotational axis of said spindle as said outer-race stop,
   (3) paired locking nuts which engage said locking section, and
   (4) an inner-race stop on the side of said fulcrum shoulder opposite to said shank.

3. The live-centered chuck of claim 1 wherein said cantilever bearing means comprises:
   (1) an inner race which is adjacent to said cantilever bearing section,
   (2) an outer race which is adjacent to the inner surface of said cavity, and
   (3) a plurality of needle bearings which rotate between said inner and outer races.

4. The live-centered chuck of claim 1 wherein said thrust bearing means comprises thrust roller bearings operating between tapered outer races, which are integrally formed and tightly locked in place between said outer-race stop and said thrust shoulder, and tapered inner races, which abut against said inner-race stop and said locking nuts.

References Cited

UNITED STATES PATENTS

| | | | |
|---|---|---|---|
| 2,496,545 | 2/1950 | Kraemer | 82—33 |
| 2,555,419 | 6/1951 | Reaves et al. | 279—16 |

LEONIDAS VLACHOS, Primary Examiner

U.S. Cl. X.R.

279—16